United States Patent
Choi (10) Patent No.: US 7,547,079 B2
(45) Date of Patent: Jun. 16, 2009

(54) ELASTIC CRAWLER

(75) Inventor: Yong Jae Choi, Taejon (KR)

(73) Assignee: Xenith Track Co., Ltd., Taejon (KR)

( * ) Notice: Subject to any disclaimer, the term of this patent is extended or adjusted under 35 U.S.C. 154(b) by 204 days.

(21) Appl. No.: 10/581,850

(22) PCT Filed: Dec. 1, 2004

(86) PCT No.: PCT/KR2004/003142

§ 371 (c)(1),
(2), (4) Date: Jun. 5, 2006

(87) PCT Pub. No.: WO2005/054044

PCT Pub. Date: Jun. 16, 2005

(65) Prior Publication Data

US 2007/0114845 A1    May 24, 2007

(30) Foreign Application Priority Data

Dec. 4, 2003   (JP)   ............................. 2003-406157
Apr. 26, 2004   (JP)   ............................. 2004-130001

(51) Int. Cl.
B62D 55/24   (2006.01)
(52) U.S. Cl. ..................................... 305/177; 305/178
(58) Field of Classification Search ................. 305/165, 305/167, 171, 172, 173, 174, 177, 178
See application file for complete search history.

(56) References Cited

U.S. PATENT DOCUMENTS 5,380,076 A * 1/1995 Hori .......................... 305/171
6,170,925 B1 * 1/2001 Ono .......................... 305/177
6,422,666 B2 * 7/2002 Choi .......................... 305/178
7,044,567 B2 * 5/2006 Ishibashi .................... 305/167
2001/0054845 A1 12/2001 Choi
2006/0163944 A1 * 7/2006 Tsuru et al. ................. 305/165

FOREIGN PATENT DOCUMENTS

| EP | 1 167 169 A2 |   | 1/2002 |
|----|---|---|---|
| JP | 5-32183 | * | 2/1993 |
| JP | 06-234376 |   | 8/1994 |
| JP | 08-239067 |   | 9/1996 |
| JP | 2002029461 |   | 1/2002 |

* cited by examiner

*Primary Examiner*—Russell D Stormer (57) ABSTRACT

Disclosed is an elastic crawler formed with an elastic material in the shape of an endless track, and used as the wheel for the work vehicle with enhanced reliability and durability. The elastic crawler includes a crawler body 2A formed with an elastic material and having lugs 4L, 4R, 5L and 5R protruded at the ground contact side thereof, and cores 3 having wings 3L and 3R extended left and right to the center of the crawler body in the width direction thereof, and arranged parallel to each other in the longitudinal track direction of the crawler body such that the wings face the lugs formed at the crawler body. The crawler body has first and second lug units alternately arranged parallel to each other in the longitudinal tract direction thereof (in the direction of Y1 and Y2). The first lug unit has left lugs 4L facing each other over two wings, and rights lugs 4R arranged right to the center of the crawler body while proceeding symmetrical to the left lugs around the center. The second lug unit has left lugs 5L facing each other over one wing, and right tugs 5R arranged right to the center of the crawler body while proceeding symmetrical to the left lugs around the center.

6 Claims, 9 Drawing Sheets

ELASTIC CRAWLER

TECHNICAL FIELD

The present invention relates to an elastic crawler, and in particular, to an elastic crawler which is formed with an elastic material while taking a shape of an endless track, and used as the wheel of the work vehicle under bad working conditions, for example, on the steep and rough road.

BACKGROUND ART

Generally, iron caterpillars have been commonly used as the wheels for the work vehicles under the bad working conditions, such as a steep and rough road condition. However, as the iron caterpillars involve a heavy weight, a poor fuel efficiency and a loud noise, elastic crawlers have been recently introduced instead of the iron caterpillars.

The elastic crawler has a crawler body, and cores. The crawler body is based on an elastic material with a shape of an endless track. The cores are embedded in the crawler body with right and left wings extended left and right from the center of the crawler body, that is, in the width direction of the crawler body. The cores are arranged in the longitudinal direction of the track parallel to each other with a predetermined distance.

Raised lugs are formed at the ground contact side of the crawler body, and concave earth removal portions are disposed between the lug neighbors. The lugs are divided into left and right to the center of the crawler body in the width direction thereof, and overlapped with left and right wings of the cores, respectively. Japanese Patent Laid-open Publication No. 2002-29461 discloses such an elastic crawler.

With the elastic crawler, the one-sided lugs have ground contact surfaces overlapped with the projections of the neighboring wings in the longitudinal track direction, and the opposite-sided lugs have ground contact surfaces overlapped with the projections of the corresponding wings.

The lengths of the ground contact surfaces of the left and the right lugs are different from each other, and those lengths with the respective left lugs as well as with the respective right lugs are also different from each other. The left and the right lugs differentiated in the ground contact length are arranged in a zigzag pattern.

With the elastic crawler disclosed at the above publication, the left and right lugs with ground contact surfaces differentiated in the ground contact length are arranged with a zigzag pattern, and overlapped with the projections of the wings, thereby enhancing the flexibility at a section for wrapping the crawler around the driving wheel, inhibiting the release of the crawler from the sprocket, and reducing the vibration.

However, in such an elastic crawler where the ground contact lengths of the ground contact surfaces of the left and right lugs are different from each other, the lug with a relatively short ground contact length is liable to be deteriorated in rigidity.

Furthermore, when the elastic crawler is circularly operated, the external forces applied to the left and the right lugs are differentiated, and this causes stress to the elastic crawler. In this case, cracks are liable to be made at the stress-concentrated area, resulting in deteriorated reliability and durability of the elastic crawler.

In addition, as the lugs having ground contact surfaces with different ground contact lengths are divided left and right from the center of the crawler body in the width direction thereof, and arranged in a zigzag pattern, any one of the pair of core neighbors is necessarily overlapped or straddled with the lug. For this reason, although slightly improved, it is not possible to obtain sufficient flexibility, and to completely remove the crawler release factor.

DISCLOSURE OF INVENTION

Technical Solution

It is an object of the present invention to provide an elastic crawler which involves enhanced reliability and durability.

This and other objects may be achieved by an elastic crawler with the following features.

According to one aspect of the present invention the elastic crawler includes a crawler body formed with an elastic material in the shape of an endless track, and cores having wings extended left and right to the center of the crawler body in the width direction thereof. The crawler body has lugs protruded at the ground contact side thereof. The cores are arranged parallel to each other in the longitudinal track direction of the crawler body such that the wings face the lugs formed at the crawler body.

First and the second lug units are alternately arranged parallel to each other in the longitudinal tract direction of the crawler body. The first lug units each have first right lugs facing each other over two wings and arranged right to the center of the crawler body in the width direction thereof, and first left lugs arranged left to the center while proceeding symmetrical to the first right lugs around the center. The second lug units each have second right lugs facing each other over one wing and arranged right to the center of the crawler body in the width direction thereof, and second left lugs arranged left to the center while proceeding symmetrical to the second right lugs around the center.

With the above structure, as the first right and left lugs of the first lug unit proceed symmetrical to each other around the center of the crawler body in the width direction thereof, and the second right and left lugs of the second lug unit proceed symmetrical to each other around the center of the crawler body in the width direction thereof, the left and right balance of the elastic crawler can be maintained. Consequently, with the circular driving of the elastic crawler, the stress can be prevented from being generated therein, and the reliability and durability thereof can be enhanced.

Furthermore, as the first left and right lugs of the first lug unit face each other over the wings of two cores, and the second left and right lugs of the second lug unit face each other over the wing of one core, it becomes possible to realize sufficient flexibility, and to securely prevent the release of the crawler from the sprocket.

According to one feature of the present invention the longitudinal track length of the ground contact surface firmed at the first right lug of the first lug unit is established to be the same as the longitudinal track length of the ground contact surface formed at the second right lug of the second lug unit, and the longitudinal track length of the ground contact surface formed at the first left lug of the first lug unit is established to be the same as the longitudinal track length of the ground contact surface formed at the second left lug of the second lug unit With the above structure, the front and rear balance of the crawler in the longitudinal track direction thereof can be enhanced, and the stress and the vibration can be prevented from being generated therein.

According to one feature of the present invention the first and the second left lugs have first extensions extended in the longitudinal track direction, and the first and the second right lugs have second extensions extended in the longitudinal track direction as like with the first extensions.

With the above structure, as first and second extensions are formed at the first and the second right lugs as well as at the first and the second left lugs such that they proceed in the longitudinal track direction, the ground contact surface area of the elastic crawler becomes widened, and hence, it becomes possible to heighten the rigidity of the elastic crawler. Furthermore, as the extensional direction of the first extension is established to be the same as the extensional direction of the second extension, the vibration is prevented from being generated in the crawler.

According to vet another feature of the present invention the plan-viewed length of the sidewall formed at the periphery of the first and the second right lugs and the first and the second left lugs while being sided with first and the second extensions is established to be smaller than the plan-viewed length of the sidewall placed opposite to the first and the second extensions.

With the above structure, as the distance between the neighboring lugs in the longitudinal track direction of the crawler body is short, and the area of the lugs at the ground contact side of the crawler body is widened, the rigidity of the elastic crawler can be heightened.

Although it may be considered that the plan-viewed length of the sidewall positioned opposite to the first and the second extensions is established to be relatively short as in the plan-viewed length of the sidewall sided with the first and the second extensions, such a structure is not preferable in that the rigidity of the respective lugs is not high, and the penetrability thereof with respect to the surface of the road is deteriorated.

According to another aspect of the present invention as the elastic crawler includes a crawler body formed with an elastic material in the shape of an endless track, and cores having wings extended left and right to the center of the crawler body in the width direction thereof. The crawler body has lugs protruded at the ground contact side thereof. The cores are arranged parallel to each other in the longitudinal track direction of the crawler body such that the wings face the lugs formed at the crawler body.

Lug units are positioned left and right to the center of the crawler body in the width direction thereof, and arranged parallel to each other in the longitudinal track direction of the crawler body. The lug units each have first lugs facing each other over two wings and arranged one-sidedly with respect to the center of the crawler body in the width direction thereof, and second lugs facing each other facing each other in the longitudinal track direction of the crawler body. The first and the second lugs have extensions extended in the longitudinal tract direction, and the extensions of the first and the second lugs facing each other in the width direction of the crawler body are partially overlapped with each other in the longitudinal track direction of the crawler body.

With the above structure, as the lug units are arranged parallel to each other in the longitudinal track direction of the crawler body while being positioned left and right to the center of the crawler body in the width direction thereof, and the extensions of the first or the second lugs facing each other in the width direction of the crawler body are partially overlapped with each other in the longitudinal track direction of the crawler body so that the ground contact surface of at least one of the lugs contacts the ground, it becomes possible to reduce the up and down movement variation of the elastic crawler with respect to the ground surface during the circular driving, and to inhibit the generation of vibration.

According to one feature of the present invention the longitudinal track length of the ground contact surface formed at the first lug is established to be the same as the longitudinal track length of the ground contact surface formed at the second lug.

With the above structure, as the longitudinal track lengths of the ground contact surfaces formed at the lugs of the crawler body are all the same, the balance of the crawler body in the width direction and in the direction perpendicular thereto (in the direction of the circular rotation) is enhanced. Furthermore, as the entire ground contact area of the crawler body is increased, the rigidity of the crawler body can be heightened, and the elastic crawler can be prevented from being released from the sprocket during the rotation thereof.

According to another feature of the present invention the first lugs or the second lugs positioned right to the center of the crawler body in the width direction thereof, and the first lugs or the second lugs positioned left to the center of the crawler body in the width direction thereof are arranged at the left and the right sides of the crawler body, respectively. With the above structure, as the lugs are arranged left and right to the center of the crawler body in the width direction thereof, the ground contact surface of at least one of the lugs necessarily contacts the ground surface with increased contact area it becomes possible to more securely prevent the release of the crawler from the sprocket during the rotation thereof In short, with the structure according to the present invention, the left and right balance of the elastic crawler is enhanced with heightened rigidity and flexibility, and the vibration is prevented from being generated therein.

BRIEF DESCRIPTION OF THE DRAWINGS

The above and other advantages of the present invention will become more apparent by describing preferred embodiments thereof in detail with reference to the accompanying drawings in which.

MODE FOR THE INVENTION

The present invention will be described more fully hereinafter with reference to the accompanying drawings, in which preferred embodiments of the invention are shown.

Figure 1:
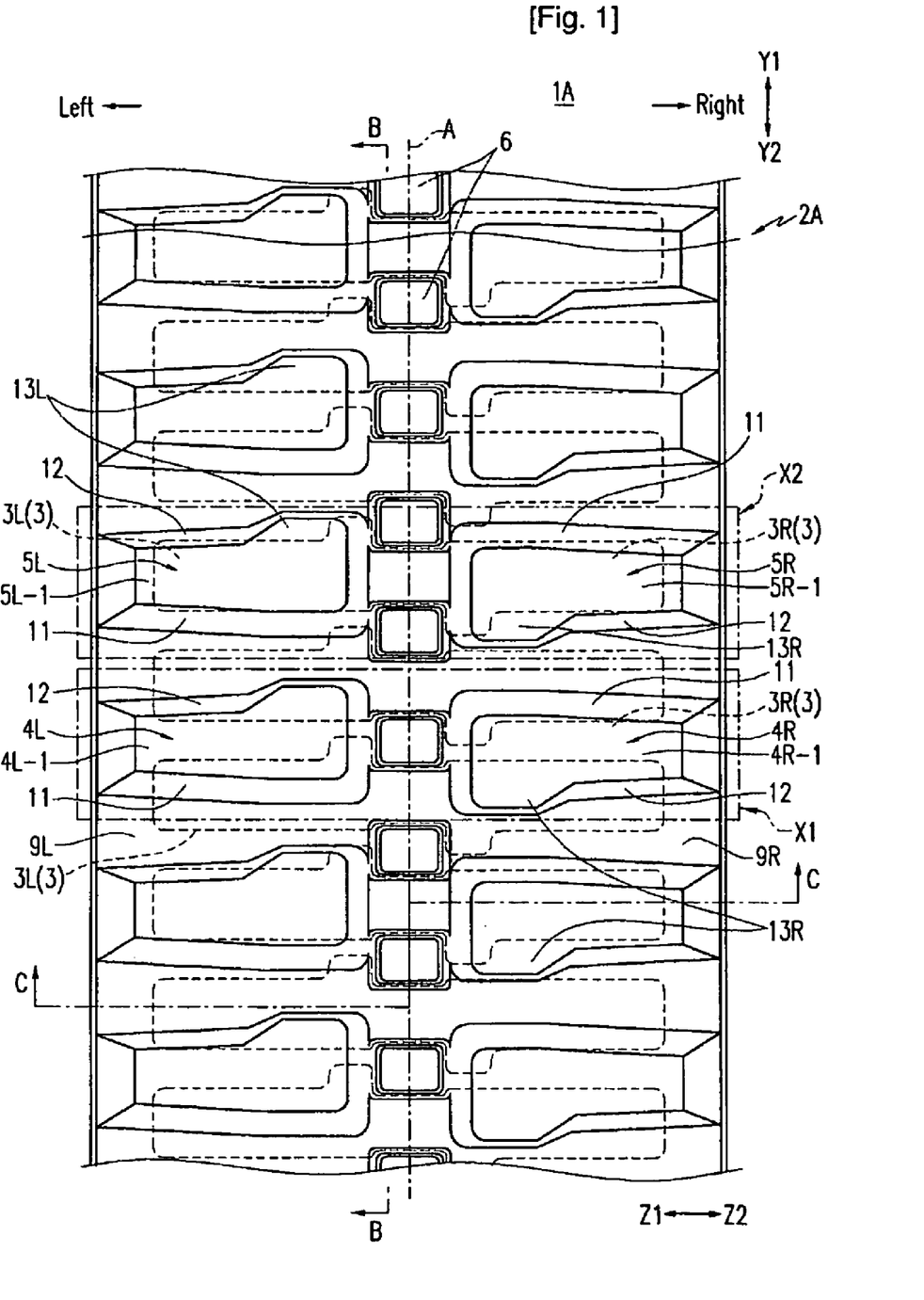
FIG. 1 is a plan view of an elastic crawler according to a first embodiment of the present invention.
Figure 2:
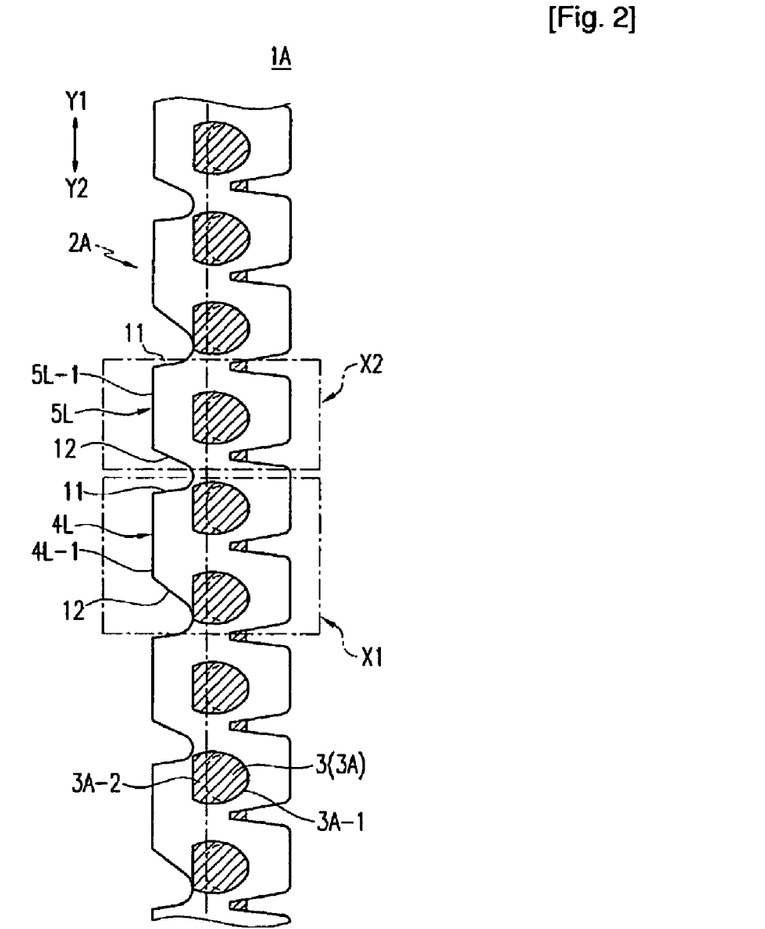
FIG. 2 is a vertical sectional view of the elastic crawler according to the first embodiment of the present invention, taken along the B-B line of FIG. 1.
Figure 3:
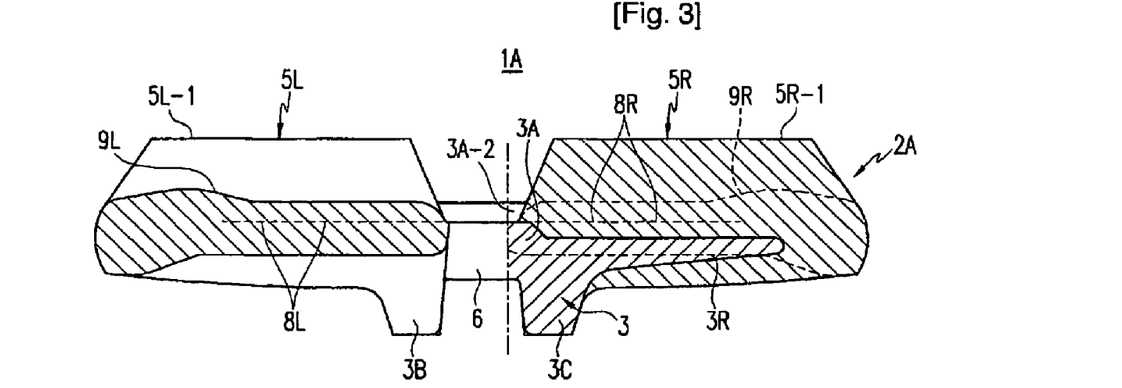
FIG. 3 is a horizontal sectional view of the elastic crawler according to the first embodiment of the present invention, taken along the C-C line of FIG. 1.
Figure 4:
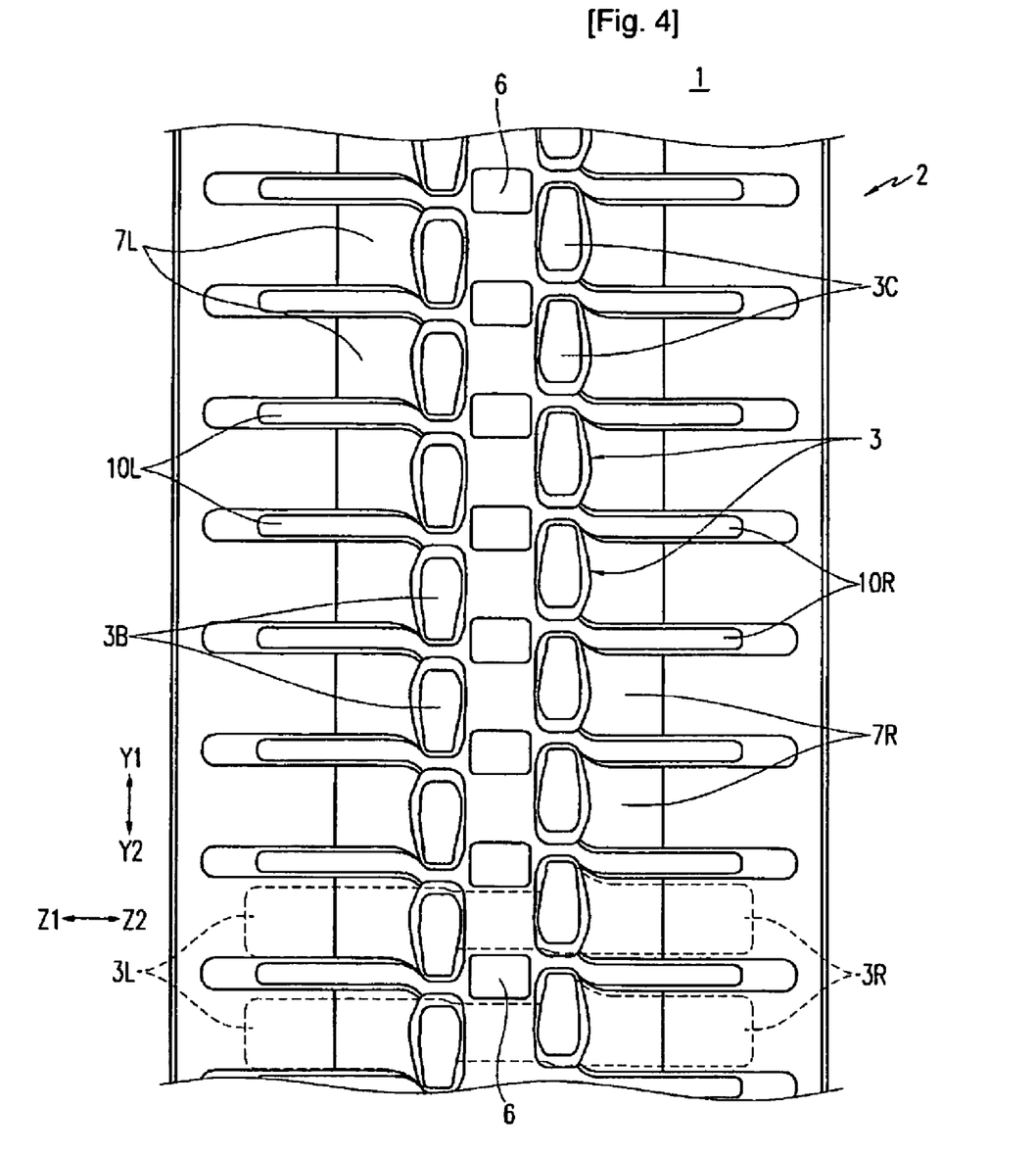
FIG. 4 is a bottom view of the elastic crawler according to the first embodiment of the present invention.

FIGS. 1 to 4 illustrate an elastic crawler 1A according to a first embodiment of the present invention. FIG. 1 is a plan view of the elastic crawler 1A, FIG. 2 is a sectional view of the elastic crawler taken along the B-B line of FIG. 1, FIG. 3 is a sectional view of the elastic crawler taken along the C-C line of FIG. 1, and FIG. 4 is a bottom view of the elastic crawler 1A.

The elastic crawler 1A is, for instance, used as the wheel for the work vehicle under the bad working conditions, such as steep and rough roads. The elastic crawler 1A is shaped with an endless track (a ring) as in the caterpillars, but for convenience, only a part of the elastic crawler 1A is amplified, and illustrated.

Roughly speaking, the elastic crawler 1A has a crawler body 2A, and cores 3. The crawler body 2A is formed with an elastic material (elastomer), such as rubber, and has a shape of an endless track. As shown in FIGS. 1 to 5, a plurality of lugs 4L, 4R, 5L and 5R, connection holes 6, and earth removal portions 9L and 9R are formed at the ground contact side of the crawler body 2A. As shown in FIG. 4, guides 7L and 7R and flex grooves 10L and 18R are formed at the side of the crawler body 24 opposite to the ground contact side thereof. For explanatory convenience, the specific structure of the crawler body will be described later.

Figure 7:
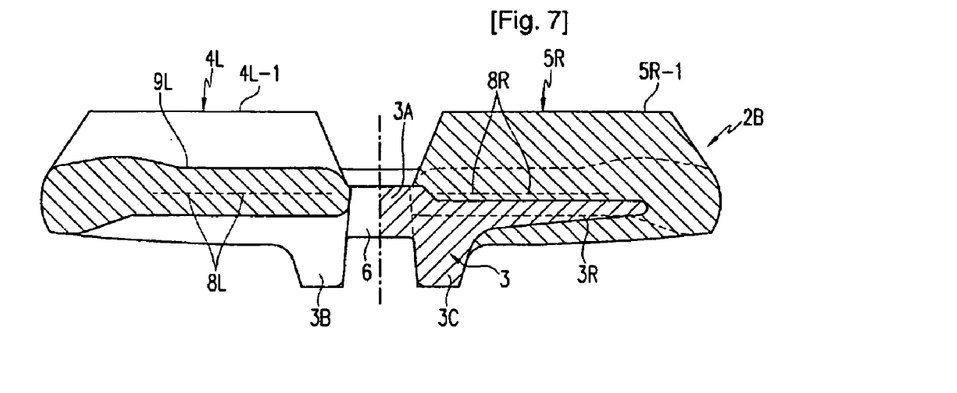
FIG. 7 is a cross sectional view of the elastic crawler according to the second embodiment of the present invention, taken along the C-C line of FIG. 5.

The core 3 is formed with a metallic material through casting or pressing. In this embodiment, the core 3 is based on the cast metal. The core 3 has left and right wings 3L and 3R extended left and right from a central connecting portion 3A, and protrusions 3B and 3C formed at the center thereof. As shown in FIG. 7, the cores 3 are arranged parallel to each other in the longitudinal direction of the track (the direction indicated by the arrows Y1 and Y2), and embedded in the crawler body 2A.

As shown in FIG. 3, the left and right protrusions 3B and 3C formed at the cores 3 are deviated from each other in the longitudinal track direction, and arranged left and right with a zigzag pattern. The zigzag arrangement of the left and right protrusions 3B and 3C makes it possible to reduce the vibration. Furthermore, the material for the cores 3 is not limited to the metal, but may be formed with rigid resin, or rigid resin mixed with reinforcing fiber.

The connecting portion 3A of the core 3 is connected to the driving claw of the sprocket (not shown). For this reason, as shown in FIG. 2, the inner circumferential surface 3A-1 of the connecting portion 3A is formed with an arc such that the coupling of the sprocket claw thereto or the decoupling thereof can be made smoothly. Furthermore, as shown in FIG. 2, the inner circumferential surface 3A-1 is externally coated with a rubber coat (3A-2), thereby preventing the rust generation.

As shown in FIGS. 1 to 3, the above-structured cores 3 are arranged parallel to each other, and embedded in the crawler body 2A such that the crawler body 2A and the cores 3 are unified in a body, thereby forming an elastic crawler 1A. Connection holes 6 for holding the sprocket claws are arranged at the center of the crawler body 2A in the width direction thereof (the direction of the arrows Z1 and Z2 in the drawing) with a predetermined distance.

The connecting portions 3A formed at the cores 3 are structured such that the cores 3 are placed at the front and the rear of the connection holes 6 while being combined with the crawler body 2A. That is, in order to drive the elastic crawler 1A, the sprocket claws connected to the connecting portions 3A of the cores 3 through the connection holes 6 apply the driving power to the elastic crawler 1A. In case the rotation wheel is an outer protrusion type, as shown in FIG. 4, the side of the crawler body 2A opposite to the ground-contact side thereof makes formation of track-typed guides (rails) 7L and 7R external to the left and the right protrusions 3B and 3C.

Furthermore, as shown in FIG. 3, tension resistance members 8L and 8R are embedded in the crawler body 2A sided with the ground contact surfaces of the left and right wings 3L and 3R of the core 3. The tension resistance members 8L and 8R are formed by tensioning a steel cord, and embedded in the crawler body 2A left and right. The tension resistance members 8L and 8R are formed to be substantially endless (with a ring shape), and prevent the crawler body 2A from being elongated.

As shown in FIG. 4, flex grooves 10L and 10R are formed at the side of the crawler body 2A opposite to the ground-contact side thereof to heighten the flexibility at the wrapping section thereof to be engaged with the sprocket claws. The flex grooves 10L and 10R are extended in the width direction of the track (in the direction of Z1 and Z2) to prevent the stress concentration.

Figure 5:
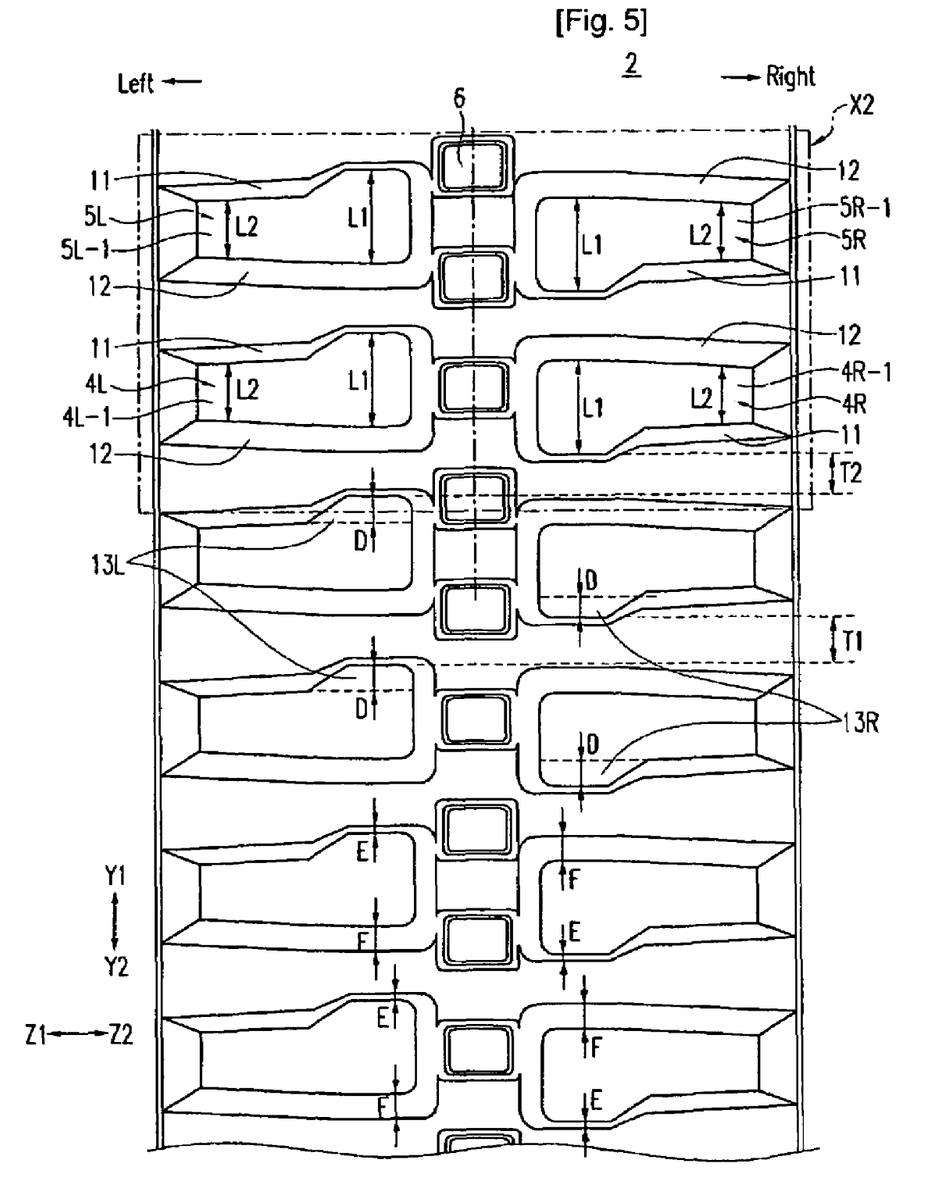
FIG. 5 is a plan view of a crawler body fir the elastic crawler according to the first embodiment of the present invention.

The lugs 4L, 4R, 5L and 5R formed at the crawler body 2A will be now explained mainly with reference to FIGS. 1 and 5.

The lugs 4L, 4R, 5L and 5R are protruded at the ground-contact surface of the crawler body (2A) with a raised shape. Earth removal portions 9L and 9R are formed between the respective lugs 4L, 4R, 5L and 5R each with a relatively concave shape. In this embodiment, a pair of the first left lug 4L and the first right lug 4R makes formation of a first lug unit X1, and a pair of the second left lug 5L and the second right lug 5R makes formation of a second lug unit X2. In the drawing, the first and the second lug units X1 and X2 are surrounded by dash and dot lines.

The first lug unit X1 will be first explained. The first lug unit X1 is structured such that two cores 3 are placed thereunder. Furthermore, the first lug unit X1 has first left and right lugs 4L and 4R.

The first left lug 4L is placed left to the center of the crawler body 2A in the width direction (in the direction of Z1 and Z2) thereof (at the location of the dash and dot line indicated by the arrow A in FIG. 1). The first left lug 4L faces the left wings 3L of the two cores 3. A first left ground contact surface 4L-1 is formed at the top of the first left lug 4L.

Meanwhile, the first right lug 4R is placed right to the center A of the crawler body 2A in the width direction thereof (in the direction of Z1 and Z2). The first right lug 4R faces the right wings 3L of the two cores 3. A first right ground contact surface 4R-1 is formed at the top of the first right lug 4R.

With the formation of the first left lug 4L and the first right lug 4R, they are formed with the same shape, but proceed symmetrical to each other left and right around the center A of the crawler body 2A in the width direction thereof. In this structure, the first lug unit X1 has one connection hole 6.

The second lug unit X2 will be now explained. The second lug unit X2 is structured such that one core 3 is placed thereunder. Furthermore, the second lug unit X1 has second left and right lugs 5L and 5R.

The second left lug 5L is placed left to the center A of the crawler body 2A in the width direction thereof (in the direction of Z1 and Z2). The second left lug 5L faces the left wing 3L of the core 3. A second left ground contact surface 5L-1 is formed at the top of the second left lug 5L.

Meanwhile, the second right lug 5R is placed right to the center A of the crawler body 2A in the width direction thereof (in the direction of Z1 and Z2). The second right lug 5R faces the right wing 3L of the core 3. A second right ground contact surface 5R-1 is formed at the top of the second right lug 5R.

With the formation of the second left lug 5L and the second right lug 5R, they are formed with the same shape, but proceed symmetrical to each other left and right around the center A of the crawler body 2A in the width direction thereof. Furthermore, the second left lug 5L and the second right lug 5R have substantially the same shape as the first left lug 4L and the first right lug 4R. The second lug unit X2 has two connection holes 6.

The above-structured first and second lug units X1 and X2 are arranged parallel to each other in the longitudinal direction of the track (in the direction of Y1 and Y2) to thereby form the crawler body 2A. As described above, the elastic crawler 1A according to the present embodiment is structured such that with the first lug unit X1, the first left lug 4L and the first right lug 4R proceed symmetrical to each other around the center A of the crawler body in the width direction thereof (in the direction of Z1 and Z2), and with the second lug unit X2, the second left lug 5L and the second right lug 5R proceed symmetrical to each other around the center A in the width direction.

Accordingly, it is possible to maintain the left and right balances of the crawler body 2A, and when the elastic crawler 2 is circularly operated, to prevent the stress generation therein. Consequently, the occurrence of cracks or breakages due to the stress in the crawler body 2A can be prevented, and the reliability and durability of the elastic crawler 2 can be enhanced.

The first left lug 4L and the first right lug 4R of the first lug unit X1 face the wings 3L and 3R of two cores 3, and the second left lug 5L and the second right lug 5R of the second lug unit X2 face only the wings 3L and 3R of one core 3. Consequently, as only the rubber-based crawler body 2A but not the core is existent at the contact area between the first lug unit X1 and the second lug unit X2, it is possible to realize sufficient flexibility while securely preventing the crawler from being released, and reducing the vibration.

The shape of the respective lugs 4L, 4R, 5L and 5R of the first and the second lug units X1 and X2 will be now explained.

As described above, the respective lugs 4L, 4R, 5L and 5R are protruded at the ground contact surface of the crawler body 2A with a raised shape, and relatively concave earth removal portions 9L and 9R are formed between the respective lugs.

Furthermore, the lugs 4L, 4R, 5L and 5R have ground contact surfaces 4L-1, 4R-1, 5L-1 and 5R-1, respectively. As the respective lugs 4L, 4R, 5L and 5R have roughly the same outline, the respective ground contact surfaces 4L-1, 4R-1, 5L-1 and 5R-1 also have roughly the same shape.

As described above, with the first lug unit X1, the first left lug 4L and the first right lug 4R proceed symmetrical to each other around the center A, and with the second lug unit X2, the second left lug 5L and the second right lug 5R proceed symmetrical to each other around the center A. Accrordingly, the ground contact surfaces 4L-1 and 4R-1 also proceed symmetrical to each other around the center A, and the ground contact surfaces 5L-1 and 5R-1 proceed symmetrical to each other around the center A. Consequently, the balance of the respective ground contact surfaces 4L-1, 4R-1, 5L-1 and 5R-1 in the width direction (in the direction of Z1 and Z2) is improved, and the stress as well as the vibration can be prevented.

The respective ground contact surfaces 4L-1, 4R-1, 5L-1 and 5R-1 have a large area part close to the center A, and a small area part distant to the center A. The longitudinal track length of the large area part is established to be large (indicated by the arrow L1 in the drawing), and the longitudinal track length of the small area part to be small (indicated by the arrow L2 in the drawing). The large area parts of all the ground contact surfaces 4L-1, 4R-1, 5L-1 and 5R-1 have the same longitudinal track length L1. With this structure, the balance of the crawler body 2A in the longitudinal track direction thereof (in the direction of Y1 and Y2) is kept to be constant, and the stress as well as the vibration can be prevented.

As the longitudinal track length L is enlarged, a first extension 13L is formed at the first ground contact surfaces 4L-1 and 5L-L, and a second extension 13R at the right ground contact surfaces 4R-1 and 5R-1. The first and the second extensions 13L and 13R proceed in the longitudinal track direction (the extensional degree of the first and the second extensions 13L and 13R being indicated by the arrow D in FIG. 5).

In this embodiment, the direction of the first extension 13L formed at the first left ground contact surface 4L-1 and the direction of the first extension 13L formed at the second left ground contact surface 5L-1 are established to be the same (the direction of the arrow Y1 in the drawing). Furthermore, the direction of the second extension 13R formed at the first right ground contact surface 4R-1 and the direction of the second extension 13R formed at the second right ground contact surface 5R-1 are established to be the same (the direction of the arrow Y2 in the drawing).

With the above structure, the first extensions 13L formed between the neighboring first and second left lugs 4L and 5L are prevented from being interfered, and the second extensions 13R formed between the neighboring first and second right lugs 4R and 5R are prevented from being interfered. Accordingly, it is possible to widen the ground contact surfaces 4L-1, 4R-1, 5L-1 and 5R-1, and to heighten the rigidity of the crawler body 2A.

Meanwhile, considering the contact state of the crawler body 2A with the surface of the road during the driving, the first and the second lug units X1 and X2 are structured such that the ground contact surfaces 4R-1 and 4L-1 are overlapped with each other in the longitudinal track direction, and similarly, the ground contact surfaces 5R-1 and 5L-1 are overlapped with each other in the longitudinal track direction. In this way, the substantially continuous ground contacting is made, and the possible vibration made during the driving of the elastic crawler 1A is prevented.

Furthermore, when the ground contacting is made from the first lug unit X1 to the second lug unit X2, or from the second lug unit X2 to the first lug unit X1, the ground contact surfaces 4L-1 and 5R-1 are not overlapped with each other in the longitudinal track direction, and the ground contact surfaces 5L-1 and 4R-1 are not overlapped with each other in the longitudinal track direction. In this embodiment, the distance between the first and the second extensions 13L and 13R positioned close to each other in the longitudinal track direction (indicated by the arrows T1 and T2 in FIG. 5) is established to be short. For this reason, the substantially continuous ground contacting at the space between the respective lug units X1 and X2 is not made, and hence, the possible vibration made during the driving of the elastic crawler 1A is prevented.

The sidewalls formed at the outer peripheries of the lugs 4L, 4R, 5L and 5R will be now explained.

As the respective lugs 4L, 4R, 5L and 5R are protruded at the ground contact side of the crawler body 2A with a raised shape, a sidewall is present at the outer periphery thereof. In this embodiment, the plan-viewed length of a first sidewall 11 sided with the first and the second extensions 13L and 13R (indicated by the arrow E in FIG. 5) is established to be shorter than the plan-viewed length of a second sidewall 12 positioned opposite to the extensions 13L and 13R (indicated by the arrow F in FIG. 5). That is, E<F.

With the above structure, it is possible to shorten the distance between the first and the second extensions 13L and 13R positioned close to each other in the longitudinal track direction (indicated by the arrows T1 and T2 in FIG. 5). Specially, with the left side to the center A, it is possible to shorten the distance between the first and the second left lugs 4L and 5L (particularly at the location of the first extension 13L), and with the right side to the center A, it is possible to shorten the distance between the first and the second right lugs 4R and 5R (particularly at the location of the second extension 13R).

Consequently, with the ground contact side of the crawler body 2A, it is possible to widen the area of the respective lugs 4L, 4R, 5L and 5R and the respective ground contact surfaces 4L-1, 4R-1, 5L-1 and 5R-1, and to heighten the rigidity of the elastic crawler 1A.

Although it may be considered that the plan-viewed length of the sidewall positioned opposite to the first and the second extensions 13L and 13R is established to be relatively short as in the plan-viewed length of the sidewall sided with the first and the second extensions 13L and 13R, such a structure is not preferable in that the rigidity of the respective lugs is not high, and the so-called penetrability with respect to the surface of the road is deteriorated.

An elastic crawler according to a second embodiment of the present invention will be now explained.

Figure 6:
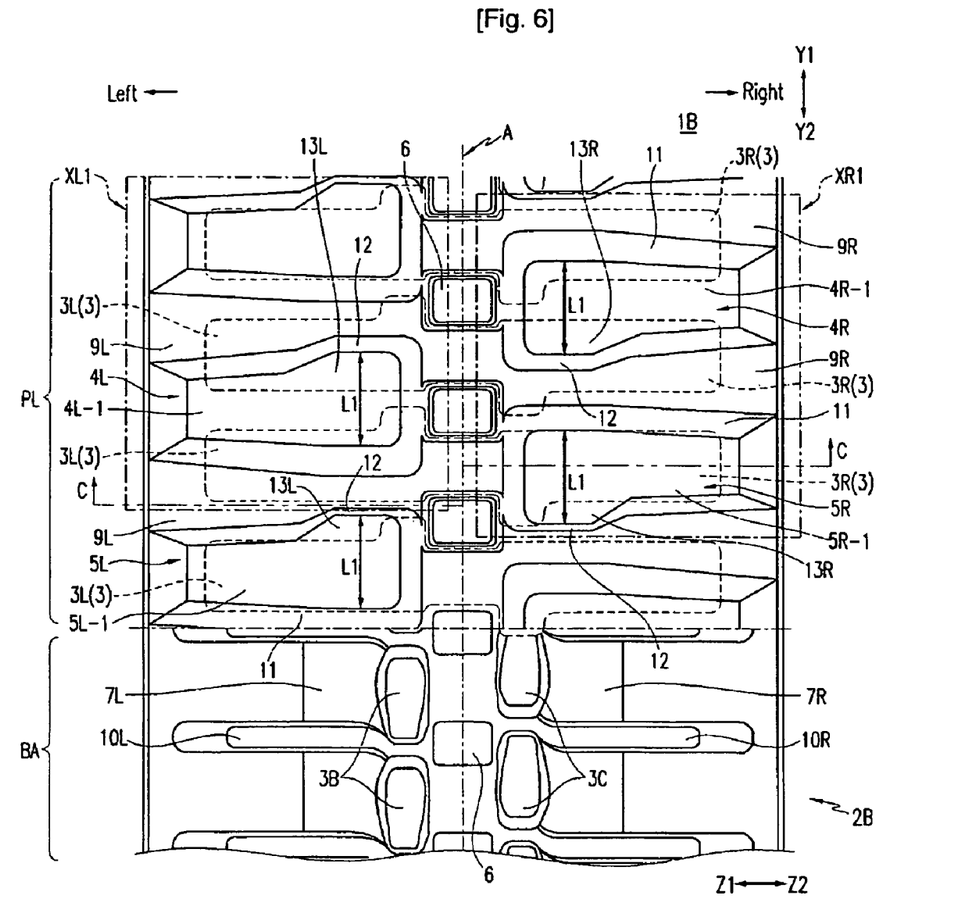
FIG. 6 is a plan and bottom view of an elastic crawler according to a second embodiment of the present invention.
Figure 8:
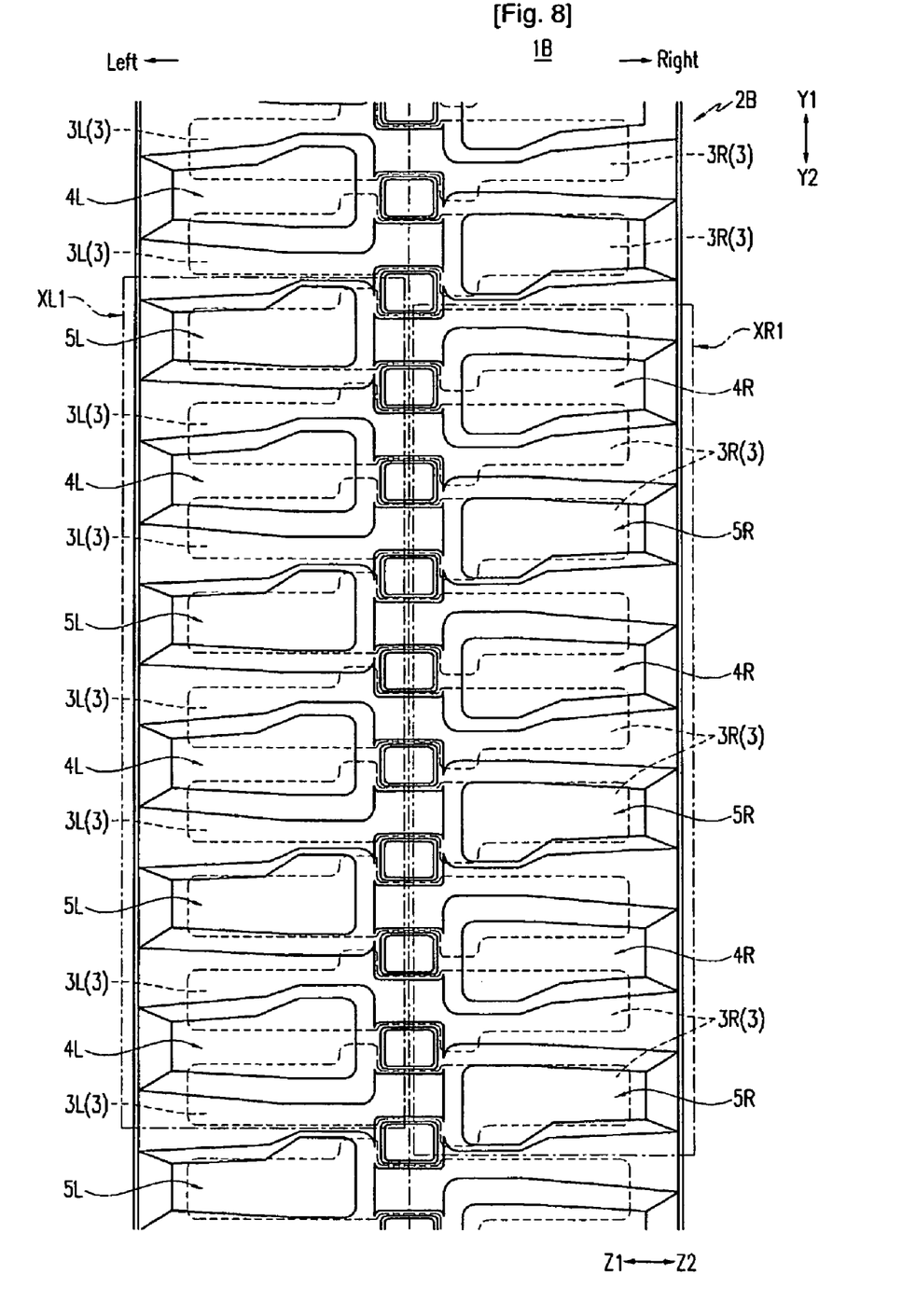
FIG. 8 is a plan view of the elastic crawler with cores according to the second embodiment of the present invention.
Figure 9:
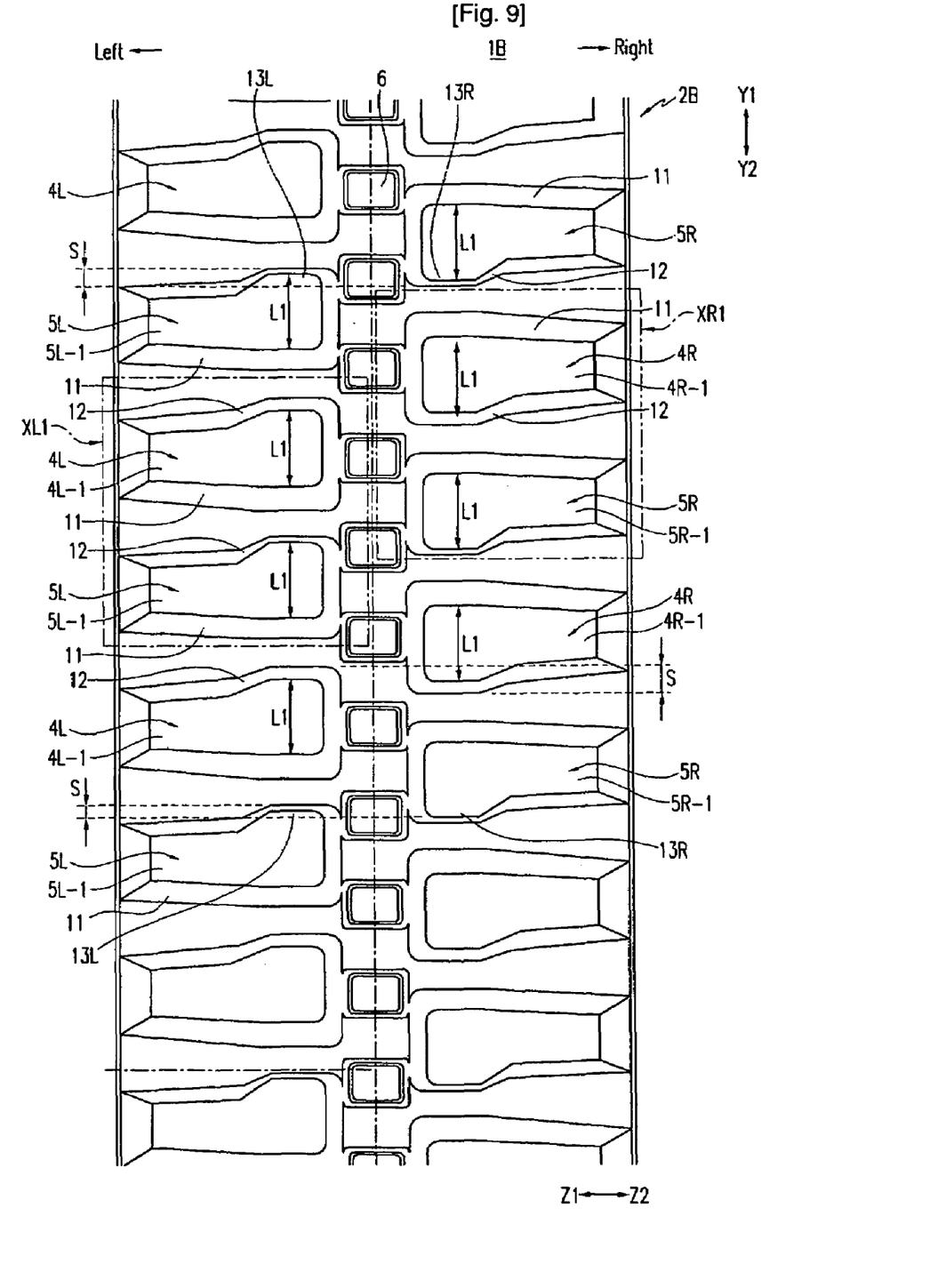
FIG. 9 is a plan view of the elastic crawler with no core according to the second embodiment of the present invention.

FIGS. 6 to 9 illustrate an elastic crawler 1B Wording to a second embodiment of the present invention. FIG. 6 illustrates a plan view of the elastic crawler 1B (indicated by PL in the drawing), and a bottom view thereof (indicated by BA in the drawing). FIG. 7 is a cross sectional view of the elastic crawler taken along the C-C line of FIG. 6. FIG. 8 is a plan view of the elastic crawler 1B in the presence of cores 3, and FIG. 9 is a plan view of the elastic crawler 1B shown in FIG. 8 in the absence of the cores 3. In FIGS. 6 to 9, like reference numerals will refer to the same components of the elastic crawler 1B as those of the elastic crawler 1A illustrated in FIGS. 1 to 5 according to the first embodiment of the present invention, and explanations thereof will be omitted.

The elastic crawler 1A according to the first embodiment of the present invention includes a first lug unit X1 with a pair of first left and right lugs 4L and 4R, and a second lug unit X2 with a pair of second left and right lugs 5L and 5R.

By contrast, the elastic crawler 1B according to the present embodiment includes a right lug unit XR1 with first and second right lugs 4R and 5R positioned right to the center A of the crawler body 2B in the width direction thereof (in the direction of Z1 and Z2), and a left lug unit XL1 with a pair of first and second left lugs 4L and 5L positioned left to the center A of the crawler body 2B.

Although the right lug unit XR1 and the left lug unit XL1 have substantially the same structure, they are arranged opposite to each other left and right around the center A of the crawler body 2A in the width direction thereof (in the direction of Z1 and Z2). Furthermore, the right lug units XR1 are arranged parallel to each other with a predetermined pitch in the longitudinal track direction of the crawler body 2A while being positioned right to the center A thereof in the width direction thereof, and the left lug units XL1 are arranged parallel to each other with a predetermined pitch in the longitudinal track direction of the crawler body 2A while being positioned left to the center A thereof.

The pitches of the right lug units XR1 and the left lug units XL1 arranged right and left to the center of the crawler body 2A do not correspond to each other. Accordingly, with the present embodiment, the first left lug 4L and the first right lug 4R are slightly deviated from each other. The specific arrangement structure thereof will be now explained.

The left and right lug units will be collectively referred to as the lug units XL1 and XR1, the first right lug 4R and the first left lug 4L as the first lugs 4L and 4R, and the second right lug 5R and the second left lug 5L as the second lugs 5R and 5L.

The lug units XL1 and XR1 are structured such that three cores 3 are placed thereunder. Furthermore, as described above, the lug units XL1 and XR1 have first lugs 4L and 4R, and second lugs 5L and 5R. The first lugs 4L and 4R face each other over the left or right wings 3L or 3R of two cores 3. First ground contact surfaces 4L-1 and 4R-1 are formed on the first lugs 4L and 4R. The second lugs 5L and 5R face each other over the right or left wing 3L or 3R of one core 3. Second ground surfaces 5L-1 and 5R-1 are formed at the second lugs 5L and 5R.

With the elastic crawler 1B according to the present embodiment, the pitches of the lug units XL1 and XR1 arranged left and right to the center of the crawler body 2A do not correspond to each other, but the first and the second left lugs 4L and 5L positioned left to the center A of the crawler body and the first and the second right lugs 4R and 5R positioned right to the center A are slightly deviated from each other in the longitudinal track direction of the crawler body 2A. That is, the respective lugs 4L, 4R, 5L and 5R are separately arranged left and right.

With the arrangement of the left and right lugs 4, 4R, 5L and 5R, during the circular driving of the crawler body 1B, the ground contact surface of 4L-1, 4R-1, 5L-1 or 5R-1 of at least one of the lugs 4L, 4R, 5L and 5R contacts the ground, and the contact area thereof is increased compared to the elastic crawler 1A related to the first embodiment. For this reason, it becomes possible to more securely prevent the release of the elastic crawler 1B from the sprocket during the rotation thereof, and to heighten the reliability of the elastic crawler 1B.

Thereafter, the shape of the respective lugs 4L, 4R, 5L and 5R for the lug units XL1 and XR1 will be noted. As described above, the lugs 4L, 4R, 5L and 5R have ground contact surfaces 4L-1, 4R-1, 5L-1 and 5R-1, respectively. The respective lugs 4L, 4R, 5L and 5R roughly have the same shape, and the respective ground contact surfaces 4L-1, 4R-1, 5L-1 and 5R-1 also roughly have the same shape.

As with the structure according to the first embodiment, the respective ground contact surfaces 4L-1, 4R-1, 5L-1 and 5R-1 have a large area part positioned close to the center A, and a small area part external to the large area part. The longitudinal track length of the large area part is established to be relatively large (indicated by the arrow L1 in the drawing), and that of the small area part to be relatively small. The longitudinal track length of the large area part is the same throughout the ground surfaces 4L-1, 4R-1, 5L-1 and 5R-1 (indicated by the arrow L1 in the drawing).

With the above structure, the crawler body 2B is well balanced in the longitudinal track direction (in the direction of Y1 and Y2), and it becomes possible to inhibit the generation of stress and vibration. With the formation of the large area part, the rigidity of the crawler body 2B becomes heightened, and in particular, it is possible to securely prevent the elastic crawler from being released from the claws of the sprocket during the rotation thereof.

Furthermore, with the present embodiment, the longitudinal track length L1 is also enlarged so that extensions 13L and 13R are formed at the respective ground contact surfaces 4L-1, 4R-1, 5L-1 and 5R-1. The respective extensions 13L and 13R proceed in the longitudinal track direction.

In this embodiment, the extensions 13L and 13R of the respective lugs 4L, 4R, 5L and 5R facing each other in the width direction of the crawler body 2A are partially overlapped with each other in the longitudinal track direction of the crawler body 2A (in the direction of Y1 and Y2). Specifically, with the second right and left lugs 5R and 5L illustrated at the top of FIG. 9, the second extension 13R formed at the second right lug 5R and the first extension 13L formed at the second left lug 5L face each other in the width direction of the crawler body 2B (in the direction of Z1 and Z2). Furthermore, the second right lug 5R is not placed on the same direct horizontal line with the second left lug 5L, but slightly deviated from the latter.

For this reason, the extensions 13L and 13R of the lugs 5L and 5R are overlapped by the part indicated by the arrow S of the drawing (referred to as the overlapped section S) in the longitudinal track direction of the crawler body 2A (in the direction of Y1 and Y2). Similarly with the first right lug 4R and the first left lug 4L, the second extension 13R formed at the first right lug 4R and the first extension 13L formed at the first left lug 4L are overlapped by the section S indicated by the arrow S of the drawing in the longitudinal tract direction of the crawler body 2A (in the direction of Y1 and Y2).

As the extensions 13L and 13R of the respective lugs 4L, 4R, 5L and 5R are overlapped by the section S in the longitudinal track direction of the crawler body 2A, with the circular driving of the elastic crawler 1B, the ground contact surface 4L-1, 4R-1, 5L-1 or 5R-1 of at least one of the lugs 4L, 4R, 5L and 5R necessarily contacts the ground. Consequently, the upper and lower movement variation of the elastic crawler 1B with respect to the ground during the circular driving thereof can be minimized, and accordingly, it becomes possible to inhibit the generation of vibration.

Figure 10:
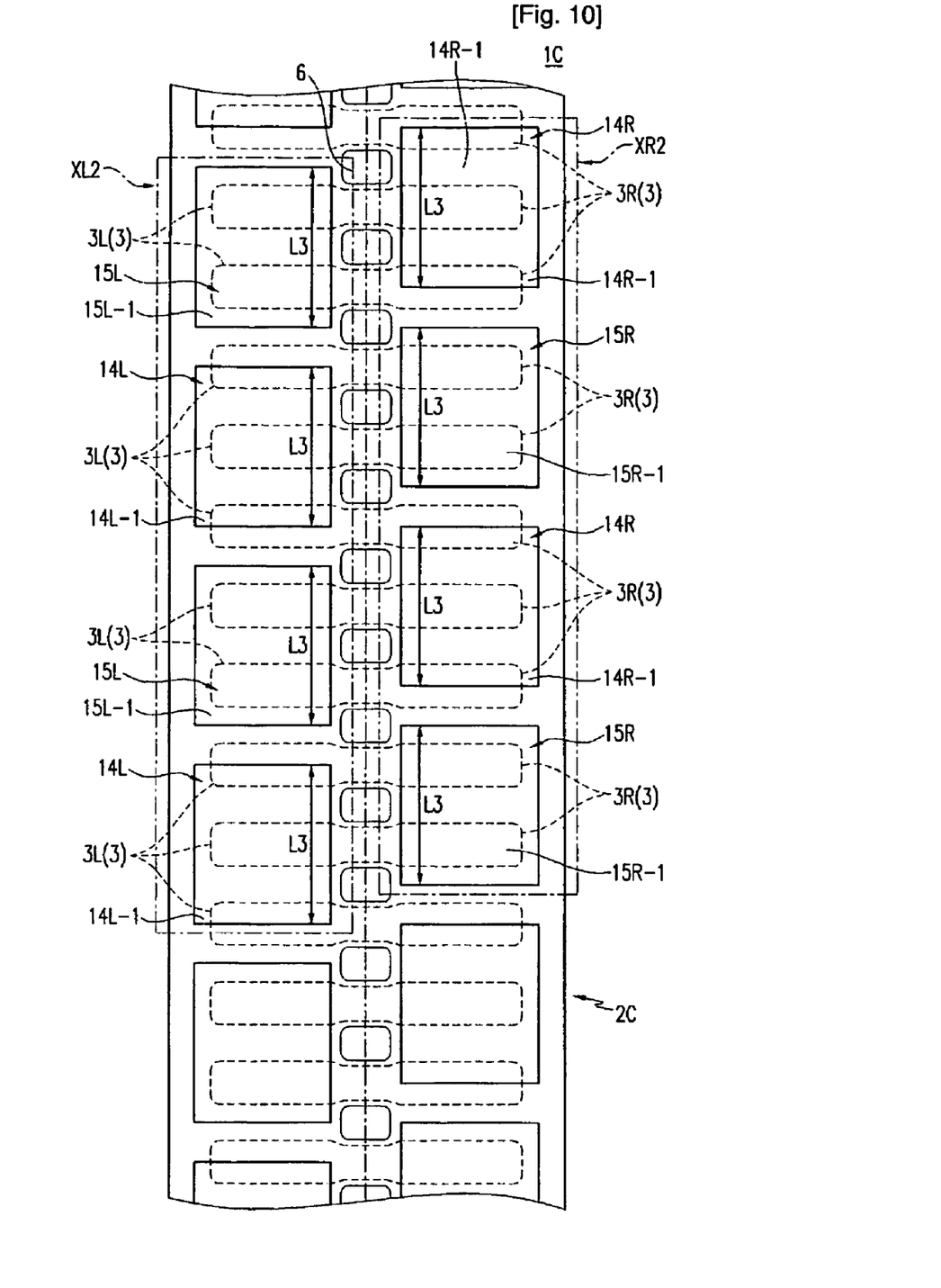
FIG. 10 is a plan view of a first variant of the elastic crawler according to the second embodiment of the present invention.
Figure 11:
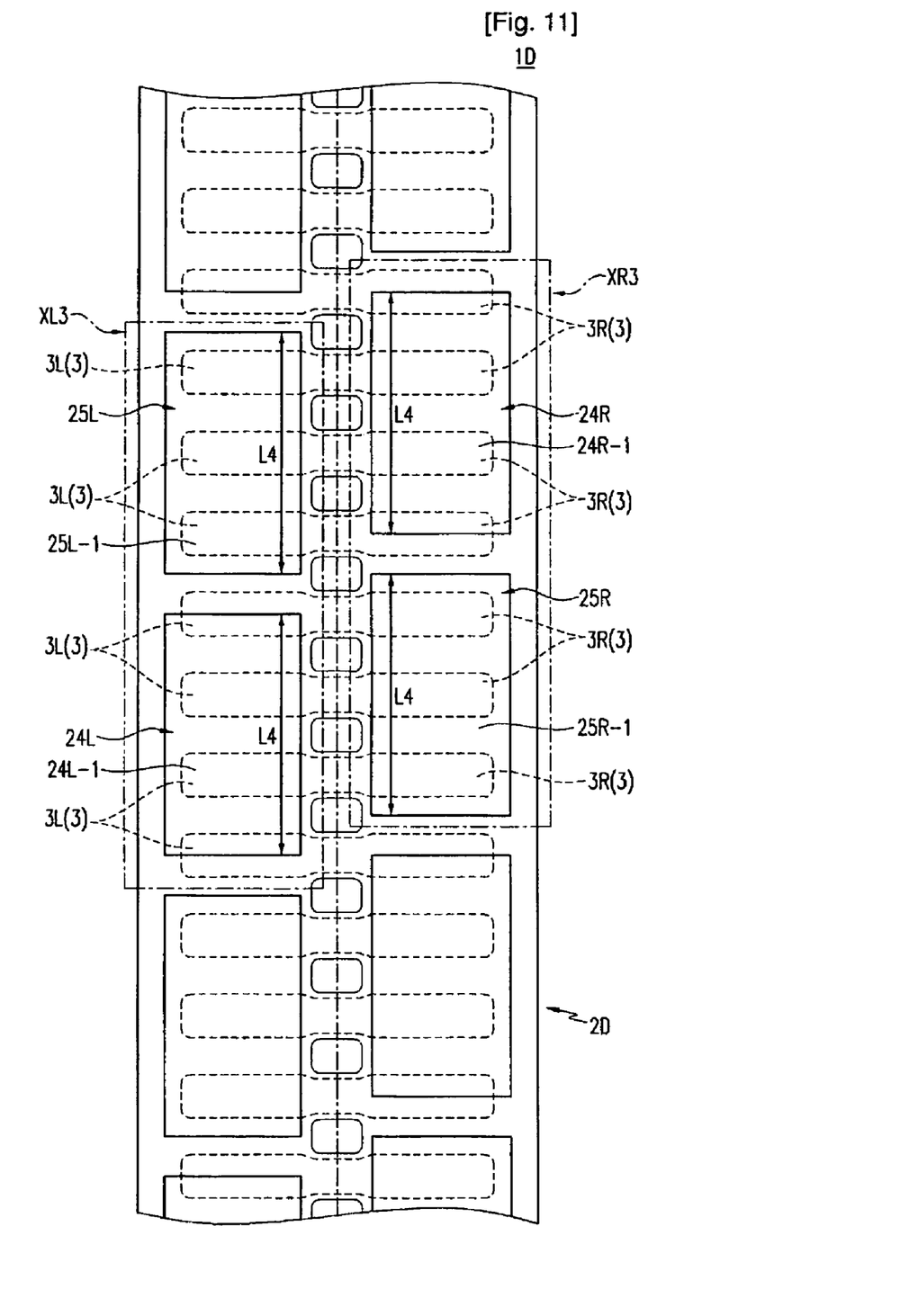
FIG. 11 is a plan view of a second variant of the elastic crawler according to the second embodiment of the present invention.

Variants of the elastic crawler 1B according to the second embodiment will be now explained. FIG. 10 illustrates an elastic crawler 1C being a first variant of the elastic crawler 1B according to the second embodiment, and FIG. 11 illustrates an elastic crawler 1D being a second variant of the elastic crawler 1B according to the second embodiment. The same structural components of the elastic crawler shown in FIGS. 10 and 11 as those shown in FIGS. 5 to 9 according to the second embodiment will be indicated by like reference numerals, and explanations thereof will be omitted.

Lug units XL2 and XR2 installed at the elastic crawler 1C according to the first variant are structured such that five cores 3 are placed thereunder. The lug units XL2 and XR2 have first lugs 14L and 14R, and second lugs 15L and 15R. The first lugs 14L and 14R face each other over the left or the right wings 3L or 3R of three cores 3. First ground contact surfaces 14L-1 and 14R-1 are formed on the first lugs 14L and 14R. Furthermore, the second lugs 15L and 15R face each other over the left or the right wings 3L or 3R of two cores 3. Second ground contact surfaces 15L-1 and 15R-1 are formed at the second lugs 15L and 15R.

With the elastic crawler 1C according to the present embodiment, the pitches of the lug units XL1 and XR1 arranged left and right to the center of the crawler body 2C in the width direction thereof (in the direction of Z1 and Z2) do not correspond to each other, and the first and the second left lugs 14L and 15L positioned left to the center of the crawler body 2C and the first and the second right lugs 14R and 15R positioned right to that center are slightly deviated from each other in the longitudinal track direction of the crawler body 2C. The large area parts of the ground contact surfaces 14L-1, 14R-1, 15L-1 and 15R-1 of the lugs 14L, 14R, 15L and 15R have the same longitudinal track length L3.

Meanwhile, lug units XL3 and XR3 installed at the elastic crawler 1D according to the second variant are structured such that seven cores 3 are placed thereunder. The lug units XL3 and XR3 have first lugs 24L and 24R, and second lugs 25L and 25R. The first lugs 24L and 24R face each other over the left or the right wings 3L or 3R of four cores 3. First ground contact surfaces 24L-1 and 24R-1 are formed on the first lugs 24L and 24R. Furthermore, the second lugs 25L and 25R face each other over the left or the right wings 3L or 3R of three cores 3. Second ground contact surfaces 25L-1 and 25R-1 are formed at the second lugs 25L and 25R.

With the elastic crawler 1D according to the present embodiment, the pitches of the lug units XL3 and XR3 arranged left and right to the center of the crawler body 2D in the width direction thereof do not correspond to each other, and the first and the second left lugs 24L and 25L positioned left to the center and the first and the second right lugs 24R and 25R positioned right to the center are slightly deviated from each other in the longitudinal track direction of the crawler body 2D. The large area parts of the ground contact surfaces 24L-1, 24R-1, 25L-1 and 25R-1 of the lugs 24L, 24R, 25L and 25R have the same longitudinal track length L4.

With the elastic crawlers according to the first and the second variants, it is possible to obtain the same effects as with the elastic crawler 1B according to the second embodiment, provided that the elastic crawlers 1C and 1D according to the first and the second variants have an advantage of heightening the rigidity of the elastic crawler, but involve a disadvantage of deteriorated flexibility with the possible crawler release problem. Accordingly, it is preferable in selecting the elastic crawlers 1A to 1D to consider the usage-adapted optimal features thereof in the aspects of rigidity, flexibility and stability.

The invention claimed is:

1. An elastic crawler having:
   a crawler body formed with an elastic material in the shape of an endless track, lugs protruding from the ground contact side of the crawler body; and
   cores arranged parallel to each other in a longitudinal track direction of the crawler body and having wings such that the wings face the lugs and extend to the left and to the right of the center of the crawler body in the width direction thereof;
   characterized by first and the second lug units which are alternately arranged parallel to each other in the longitudinal track direction of the crawler body,
   wherein the first lug units each comprise first right lugs facing each other over two wings and arranged to the right of the center of the crawler body in the width direction thereof, and first left lugs arranged to the left of the center while proceeding symmetrical to the first right lugs around the center; and
   wherein the second lug units each comprise second right lugs facing each other over one wing and arranged to the right of the center of the crawler body in the width direction thereof and second left lugs arranged to the left of the center while proceeding symmetrical to the second right lugs around the center.

2. The elastic crawler of claim 1 wherein the longitudinal track length of the ground contact surface formed at the first right lug of the first lug unit is established to be the same as the longitudinal track length of the ground contact surface formed at the second right lug of the second lug unit, and the longitudinal track length of the ground contact surface formed at the first left lug of the first lug unit is established to be the same as the longitudinal track length of the ground contact surface formed at the second left lug of the second lug unit.

3. The elastic crawler of claim 1 or 2 wherein the first and the second left lugs have first extensions extended in the longitudinal track direction, and the first and the second right lugs have second extensions extended in the longitudinal track direction as like with the first extensions.

4. The elastic crawler of claim 3 wherein the plan-viewed length of the sidewall formed at the periphery of the first and the second right lugs and the first and the second left lugs while being sided with first and the second extensions is established to be smaller than the plan-viewed length of the sidewall placed opposite to the first and the second extensions.

5. The elastic crawler of claim 2 wherein the first and the second left lugs have first extensions extended in the longitudinal track direction, and the first and the second right lugs have second extensions extended in the longitudinal track direction as like with the first extensions.

6. The elastic crawler of claim 5 wherein the plan-viewed length of the sidewall formed at the periphery of the first and the second right lugs and the first and the second left lugs while being sided with first and the second extensions is established to be smaller than the plan-viewed length of the sidewall placed opposite to the first and the second extensions.

* * * * *